UNITED STATES PATENT OFFICE 2,502,501

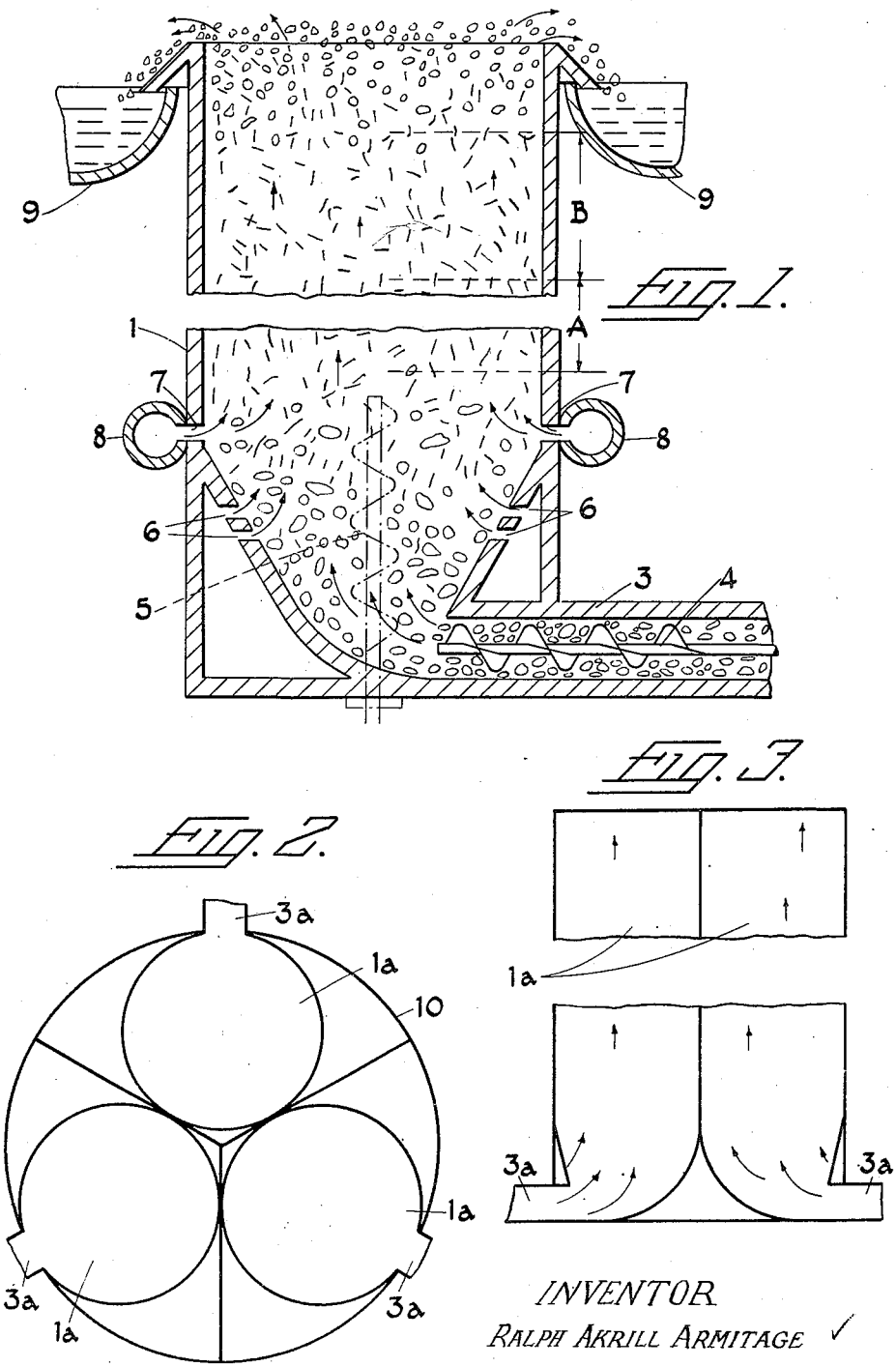

PROCESS FOR REDUCING IRON ORES

Ralph Akrill Armitage, Kenilworth, Cape Town, Union of South Africa

Application June 25, 1947, Serial No. 756,920
In the Union of South Africa November 14, 1946

2 Claims. (Cl. 75—33)

This invention relates to an improved process for the reduction or concentration of iron ores. An object of the invention is to provide a method which is simpler and cheaper than the usual known method in which the iron ore, mixed with suitable reducing agents, is treated in a blast furnace and the iron is delivered in a molten state.

According to the process of the invention a mixture of iron ore and solid carbonaceous fuel, with or without the addition of liquid fuel and/or other reducing agents, is forcibly fed by mechanical means in a continuous manner into the base of a hearth or combustion chamber, in which combustion of the fuel is arranged to take place so as to cause partial or complete reduction of the ore, the arrangement being such that the resulting ash and residual matter and reduced ore, which is not permitted to reach the molten state, is continuously discharged over the top edge of the walls of said hearth or combustion chamber or through discharge openings in the said walls above the base, whereafter the partially or completely reduced ore is separated from the ash and fuel residue and then subjected to further refining treatment such as in an open hearth furnace.

Air or other oxygen-containing gas is introduced into the upwardly moving incandescent fuel bed to effect combustion of the fuel. Preferably this is effected by a blast introduced through tuyères in the walls of the hearth or combustion chamber, preferably close to the base thereof.

Provision may also be made for the introduction, adjacent the base of the hearth or combustion chamber, of a supply of carbon-monoxide, which by augmenting the carbon-monoxide generated in the fuel bed, increases the rate at which the preliminary reduction of the iron ore takes place.

From the aforegoing it is to be understood that the ore and fuel mixture is forced into the base of the hearth or combustion chamber under sufficient pressure to cause the mass of material therein to move or flow slowly in an upward direction so that the ash or the equivalent and the partially or completely reduced ore, overflows over the top edge of the walls or over the edge of discharge openings provided therein. The speed of such upward movement and/or the distance the fuel and ore mass has to travel before overflowing, plus the quantity and quality of the fuel used, are so chosen that the required degree of reduction or concentration has taken place by the time it reaches the discharge edge or opening. Preferably the conditions are so arranged that the time during which a unit quantity of the mass passes through the burning or incandescent zone in the hearth or combustion chamber, is sufficient to cause the ore therein to be partially or completely reduced so that it is discharged in a pasty or sintered state in relatively small masses or lumps which are readily separable from the ashes and fuel residue such as by screening, washing and/or magnetic separation etc.

The solid carbonaceous fuel mixed with the ore may be coal, coke or charcoal, or a mixture thereof. The ore and fuel are broken up to a convenient size and mixed in proportions which are determined by the composition of the ore being treated and the quality of the fuel used.

According to the invention, the apparatus for carrying out the process above described, consists of an enclosed open-topped hearth or combustion chamber, mechanical means associated therewith for the forcible introduction of the ore and fuel mixture at a point or points at or adjacent the base of said hearth or combustion chamber so that by a displacement action it is caused to move or flow upwardly within the containing walls thereof during combustion of the fuel, and so that the completely or partially reduced ore and fuel residue is caused to overflow over the top edge of said walls or over the edge or edges of one or more discharge openings therein, and means for introducing a blast of air or other oxygen-containing gas for combustion purposes into the burning mass of material as it is caused to flow upwardly within the hearth or combustion chamber.

Preferably the means for introducing the ore and fuel mixture, is of the mechanical stoker type of apparatus with or without associated air blast devices. Alternatively, the combustion air may be introduced through a plurality of tuyères provided in the walls above the base of the hearth or combustion chamber.

In practising the invention, fuels of an inferior quality may be used. The iron is discharged in concentrated form and is not reduced to a molten state, but in a pasty or sintered condition and is discharged in the form of small lumps the size of coal between nut and cobble size.

In order that the invention may be more clearly understood and carried into practice, reference is now made to the accompanying drawings in which like reference numerals refer to like parts throughout the several views.

In the drawings:

Fig. 1 is a substantially diagrammatic vertical cross-sectional view of a furnace for carrying out the invention in practice, Fig. 2 is a diagrammatic plan view showing modified construction of furnace, and Fig. 3 is a diagrammatic vertical sectional view taken on Fig. 2.

Referring to the drawings reference 1 denotes an open-topped vertical cylindrical combustion chamber having its bottom end of converging or hopper shape and communicating by way of a throat with a horizontal charging passage 3, in which a screw conveyor 4 coacts for forcing the mixture of ore and fuel into the combustion chamber 1. If required a second screw conveyor 5, arranged to project vertically within the combustion chamber, may be provided to assist in forcing the mixture to move in an upward direction as indicated by the arrows.

Air for combustion purposes is introduced by way of the air blast holes 6 from suitable blowers or fans not shown, and carbon-monoxide is supplied by way of the holes 7 and bustle pipe 8. The partially or completely reduced ore together with the fuel residue, is caused to overflow in a continuous manner over the top edge of the walls of the combustion chamber 1, into an annular quenching bath 9.

In operation of the furnace, preliminary reduction of the iron ore commences in the zone A at about 400° F. by the reducing action of the carbon-monoxide formed by partial combustion of the fuel and augmented by the supply from the bustle pipe 8. Higher up in the zone B carbon from the fuel commences its reducing action on the ore. The temperature in this zone is about 750° F.

As the mass approaches the top edge of the combustion chamber, where the carbon is exhausted, the temperature rises to about 1500° F. and in this zone the limestone, which may be introduced directly into this zone, or may be introduced with the iron ore and fuel into the base of the combustion chamber, commences to act on the gangue forming slag which is discharged over the top edge of the combustion chamber with the partially and completely reduced ore which is in a pasty or sintered condition.

From the foregoing it will be seen that the temperatures are low and never reach the melting point of iron. This makes the construction of the furnace cheap and its maintenance easy and economical.

The hottest zone is at the top and this results in the greatest advantage of the method, namely, that in this type of furnace neither re-oxidisation of the iron at high temperatures, nor carburization of the iron takes place which is standard practice in all ordinary blast furnaces which produce only pig iron and which has to be reduced by further processes such as the Bessemer or Siemens-Martin at a later stage.

The method according to the invention may be used for the reduction of iron ores having a high silicon content, which ores cannot at present be smelted successfully by known methods owing to the silicon being absorbed by the iron when it is in a molten state.

For the same reason the improved method avoids the absorption of phosphorus, carbon, sulphur and other impurities.

A further advantage conferred by the invention is that raw coal or soft coke can be used as the carbonaceous fuel.

Figs. 2 and 3 show a modified construction of furnace in which three combustion chambers 1a are grouped together within a casing 10 but have separate charging passages 3a.

If found necessary screw conveyors and/or inclined vanes of a revolving type may be arranged around the inside of the walls of the combustion chamber to prevent the mixture flowing more rapidly in the centre of the mass, by accelerating the flow adjacent said walls.

What I claim is:

1. An improved process for the reduction and concentration of iron ore, which comprises: forcibly feeding a mixture of iron ore, a solid carbonaceous fuel and a slag-forming constituent continuously into the base portion of a vertically-disposed open-top furnace chamber, said introduced mixture being then continuously forced upwardly through said vertically-disposed furnace chamber by pressure of continuously introduced fresh material therebeneath, said fuel undergoing combustion, and said iron ore undergoing reduction, as they travel upwardly through said furnace chamber; introducing an oxygen-containing gas into said vertically-disposed furnace chamber at point adjacent the base portion thereof, said introduced gas then travelling upwardly through said furnace chamber with said mixture, and serving to supply the oxygen needed to bring about combustion of said fuel and reduction of said ore, augmenting the supply of carbon monoxide generated in said furnace chamber by combustion of said fuel by introducing additional carbon monoxide adjacent the base portion of said furnace chamber, said introduced carbon monoxide also travelling upwardly through said furnace chamber along with said oxygen-containing gas and said mixture; and collecting said reduced ore in the form of non-molten discrete masses, after said reduced ore, together with ash and residual material resulting from combustion of said fuel, is discharged from the the upper portion of said furnace chamber by overflowing said furnace chamber, said reduced ore and said ash and residual material being forced out of said furnace chamber by displacement action of said mixture of solid carbonaceous fuel, iron ore and slag-forming constituent being continuously introduced into the base portion of said furnace chamber.

2. An improved process for the reduction and concentration of iron ore, which comprises: forcibly feeding a mixture of iron ore, a solid carbonaceous fuel and limestone continuously into the base portion of a vertically-disposed open-top furnace chamber, said introduced mixture being then continuously forced upwardly through said vertically-disposed furnace chamber by pressure of continuously introduced fresh material therebeneath, said fuel undergoing combustion, and said iron ore undergoing reduction, as they travel upwardly through said furnace chamber; introducing an oxygen-containing gas into said vertically-disposed furnace chamber at a point adjacent the base portion thereof, said introduced gas then travelling upwardly through said furnace chamber with said mixture, and serving to supply the oxygen needed to bring about combustion of said fuel and reduction of said ore; introducing an additional amount of carbon monoxide, over and above that generated in said furnace chamber by combustion of said fuel, into said furnace chamber at a point adjacent the base portion thereof, said introduced carbon monoxide also travelling upwardly through said furnace chamber along with said oxygen-containing gas and said mixture; and collecting said reduced ore in the form of non-molten discrete masses, after said reduced ore, together with ash and residual material resulting from combustion of said fuel, is discharged from the upper portion of said furnace chamber by overflowing said furnace chamber, said reduced ore and said ash and residual material being forced out of said furnace chamber by displacement action of said mixture of solid carbonaceous fuel, iron ore and limestone being continuously introduced into the base portion of said furnace chamber.

RALPH AKRILL ARMITAGE.

REFERENCES CITED

The following references are of record in the file of this patent:

UNITED STATES PATENTS

| Number | Name | Date |
|---|---|---|
| 962,006 | Cornell | June 21, 1910 |
| 981,280 | Jones | Jan. 10, 1911 |
| 1,433,854 | Sinding-Larsen | Oct. 31, 1922 |
| 1,635,950 | Nevill | July 12, 1927 |
| 1,729,776 | Hare | Oct. 1, 1929 |
| 1,758,786 | Ekelund | May 13, 1930 |
| 1,760,078 | Newkirk et al. | May 27, 1930 |
| 1,841,602 | Hornsey | Jan. 19, 1932 |
| 1,917,968 | Greene | July 11, 1933 |
| 1,937,822 | Jones | Dec. 5, 1933 |
| 1,964,917 | Johannsen | July 3, 1934 |
| 2,068,448 | Cox | Jan. 19, 1937 |
| 2,210,720 | Johnson | Aug. 6, 1940 |
| 2,321,310 | Moore | June 8, 1943 |
| 2,427,329 | Schweickart | Sept. 9, 1947 |